April 29, 1958 H. HARVEY 2,832,130
METHOD OF SECURING AN END PIECE TO A TUBE
Filed Oct. 16, 1953 2 Sheets-Sheet 1
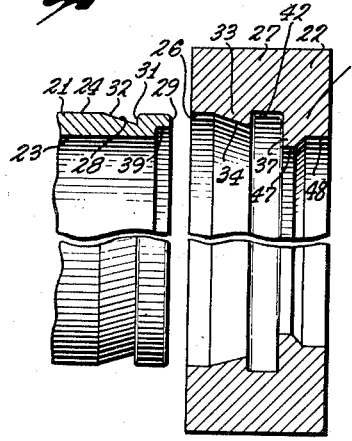
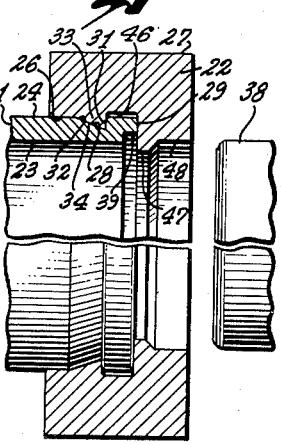
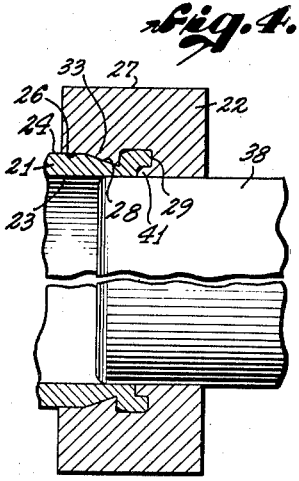
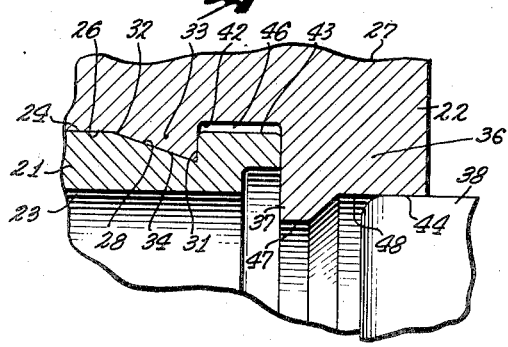
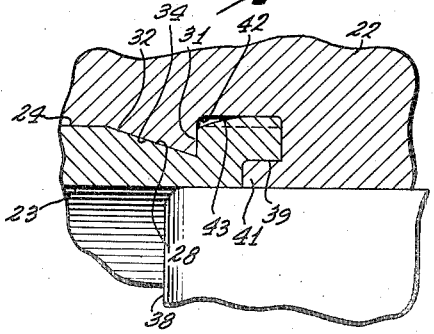
HERBERT HARVEY,
INVENTOR.
HUEBNER, BEEHLER,
WORREL & HERZIG,
ATTORNEYS.
BY Warren T. Jessup

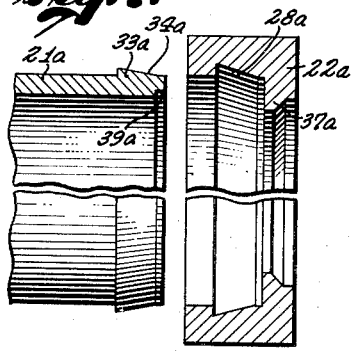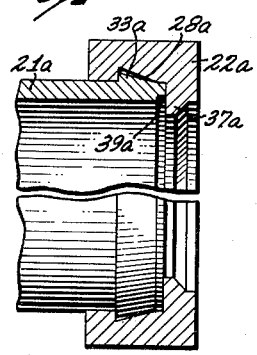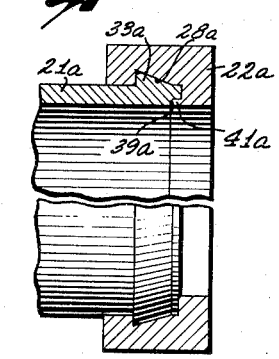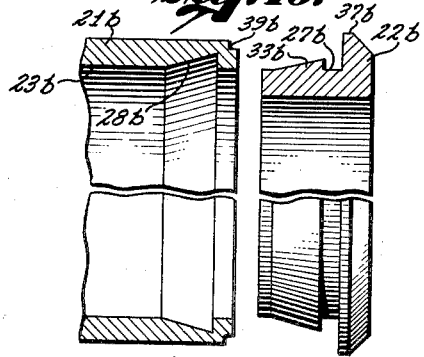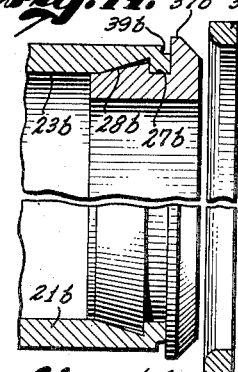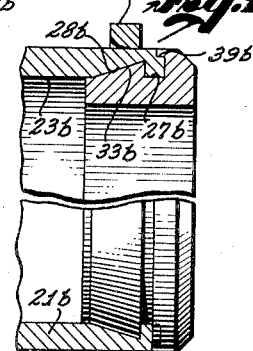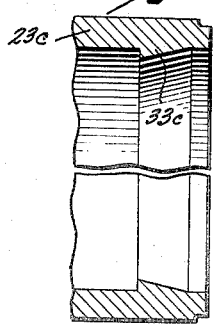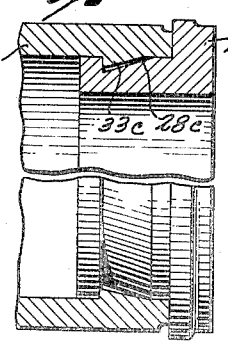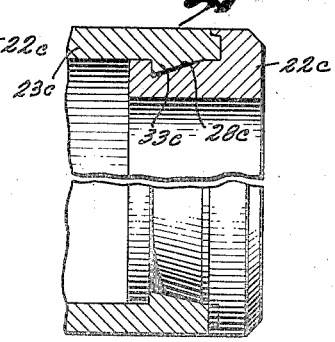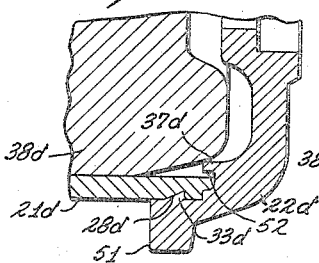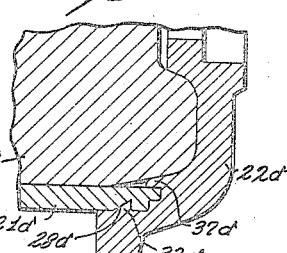

United States Patent Office 2,832,130
Patented Apr. 29, 1958

2,832,130

METHOD OF SECURING AN END PIECE TO A TUBE

Herbert Harvey, Los Angeles, Calif., assignor to Harvey Machine Co., Inc., Torrance, Calif., a corporation of California Application October 16, 1953, Serial No. 386,634

3 Claims. (Cl. 29—453)

This invention relates to a method for securing an end piece, such as a ring, over the end of a tube, and to the product resulting. The invention has particular applicability to situations where the tube and/or the ring or end piece are made of hard metal which would lose much of its hardness by a thermal weldment.

In the manufacture of certain articles, for example, rocket launching tubes or ordnance cartridges, it is often required to provide a cylindrical member, such as a tube, with a strengthening ring secured around or over the end of the tube. The tube and ring are generally of hard metal, having been heat-treated in order to bring them to a uniform hardness of from 25 to 45 Rockwell C scale. When the ring is brazed to the tube after the tube and ring have been heat-treated, the brazing operation, if done with a strong enough brazing material to meet strength requirements, lowers the hardness of the ring and tube in the region of the weldment or braze. Thus there is left a transition zone in which the tube may go from a hardness of from 20 Rockwell C scale at the weld itself, up to its normal hardness of about 36 in those regions far enough from the weldment as not to be affected by the heat of the brazing operation. Similarly, there is a transition zone of hardness in the ring, which may go from 30 Rockwell C up to 40 or 45 in the unaffected regions. This transition zone of hardness, being softer than the remainder of the article, is highly undesirable, for it represents a weak point where the article will wear faster than it does in the areas of normal hardness.

If the above objection is sought to be met by brazing the ring to the tube before heat treatment of the parts, the objection is encountered that a very high temperature brazing material is required, in order that the brazing material itself can withstand the heat treating without fusing or otherwise becoming weakened. In fact, the high temperature required for such a brazing material warps the tube and ring and makes it necessary to restraighten the tube, which is an expensive, duplicate operation.

To draw the ring integral with the tube is far too expensive to be competitive with those methods wherein the ring is placed on the tube after both parts having been formed.

The problem therefore presented is to secure the ring, or more broadly any end piece, onto and over the end of a metal tube without requiring a thermal weldment, and at the same time secure the two parts together so firmly that they will meet pull-apart test requirements, which may run up as high as 15 or 20 tons of force.

It is accordingly an object of this invention to provide a method for securing a hard metal ring, or other end piece, over and to the end of a hard metal tube, without requiring a thermal weldment.

It is another object of this invention to make such a securement as above, which will also be very strong, so as to withstand pull-apart requirements of severe usage.

It is a further object of this invention to provide a non-thermal securement in which reasonable machining tolerances may be employed in preparing the parts for engagement and securement, thereby rendering the process economically feasible.

It is another object of this invention to provide a non-thermal securement between a tube and an end piece, such as a ring, which provides a fluid seal capable of withstanding up to many thousands of pounds per square inch of fluid pressure.

Inasmuch as a thermal weldment tends to reduce the strength of the joint by as much as 60%, it is an object of this invention to provide a non-thermal securement between an end piece and a ring, which will be stronger than a corresponding thermal weldment would be.

It is another object of this invention to provide a securement of an end piece, such as a ring, over the end of a tube, which is uniformly strong and does not have any outstanding or principal weak points at which it tends to readily give way, upon application of a separating force between the ring and the tube.

In accordance with these and other objects which will become apparent hereinafter, several embodiments of the instant invention will now be described with reference to the accompanying drawings, wherein:

Fig. 1 is a longitudinal cross section showing an article constructed in accordance with the present invention.

Figs. 2, 3, and 4 are fragmentary sections showing successive steps in the fabrication of the article of Fig. 1.

Fig. 5 is an enlarged fragmentary section similar to Fig. 3, showing the joint during process of fabrication.

Fig. 6 is an enlarged fragmentary section similar to Fig. 4.

Figs. 7, 8, and 9 are a series of views similar to Figs. 2, 3, and 4, showing the fabrication steps involved in an alternative form of the present invention.

Figs. 10, 11, and 12 are successive views similar to Figs. 2, 3, and 4, showing a further alternative form of the present invention.

Figs. 13, 14, and 15 are successive views similar to Figs. 2, 3, and 4, showing a still further alternative form of the present invention.

Figs. 16 and 17 are successive fabrication views showing the principles of the present invention applied to another form of an end piece instead of a ring.

There will first be described an embodiment of the present invention in which the end piece is represented by a strengthening ring secured over and around the edge of one end of a tube which it is desired to strengthen. Later in the specification another form of end piece will be illustrated to show the applicability of the invention to other types of end pieces, not merely rings.

Referring to Fig. 1, there is shown a cylindrical tube 21 made of a steel which has a hardness ranging from 25 to 45 on the Rockwell C scale, as for example 4130 chrome nickel steel. Secured over one end of the tube 21, in accordance with the present invention, is an end strengthening end piece or member in the form of a ring 22. The ring 22 is secured over the end edge of the tube 21 in a manner which will be described more particularly with reference to Figs. 2, 3, and 4.

Referring to Fig. 2, it will be seen that the tube 21 has an inside surface 23 and an outside surface 24. The end piece or ring 22 likewise has an inside surface 26 and an outside surface 27. In the specific embodiment shown in Figs. 2 and 3, the ring 22 is secured over the outside 24 at the end of the tube 21, although in other forms it may be secured against the inside of the tube, as will be explained more fully hereinafter.

The contiguous surfaces of the tube 21 and ring 22 are formed with a ridge and groove securement. In the embodiment of Fig. 2, the contiguous side or surface of the tube 21 is the outside surface 24, which is provided with a triangular groove 28 extending peripherally around the outer surface 24 near the end edge 29 of the tube 21. The groove 28, being triangular, has essentially two faces, the face 31 nearest to the end 29 being substantially normal to the axis of the tube 21; the other face 32 being sloped, at a rather gentle wedge angle, so as to be oblique to the axis of the tube 21. The contiguous side or face of the ring 22, which in this case is the inner face or side 26, has integrally formed thereon an inwardly extending ridge 33 of shape corresponding to the groove 28 in the tube 21. Like the groove 28, the ridge 33 has a wedge surface 34 oblique to the axis of the ring.

The ring 22 has a flange or extended portion 36 which extends inwardly over the end edge 29 of the tube 21 (Fig. 3). At least a portion of the flange 36, in this case a trapezoidal portion 37, extends beyond the inner diameter of the tube 21, thus having an inner diameter which is smaller than the inner diameter of the inside 23 of the tube 21.

To assemble the parts in accordance with the instant invention, the members 21 and 22 are first aligned as shown in Fig. 2. A joining force is then applied to the two members, so as to press the ring 22 over the end of the tube 21. In this operation the wedge surface 34 of the ridge 33 rides up and over the outside edge of the tube end 29, and the inner edge of the ridge 33 then rides along the outside of the tube until the ridge 33 snaps with a sharp report down into the groove 28. The parts then occupy the relationship shown in Fig. 3.

Prior to this invention, it was the opinion of those conversant with this art, that the pressing of the ring 22 onto the tube 21, as described above, would stress either the tube or the ring, or both, beyond the elastic limit, and thus deform the members so as to spoil the resulting product. It has been found in practice, however, that such is not the case. For example, to a tube made of 4130 chrome nickel steel, heat-treated to a hardness of 38–42 Rockwell C scale, and having an inside diameter of 2.818 inches and a wall thickness of 0.85 inch, was applied an end ring 22 of similar material and having an outside diameter of 3.455 inches. A force of approximately 20 tons was required to force the ring over the end of the tube so as to snap the ridge 33 into engagement with the groove 28. The resulting product had no measurable deformation, and the hardness of the material was actually increased slightly by the minor cold working of the pressing operation.

When it is desired that a smooth inside surface of constant diameter be provided throughout the resulting product, a rabbet counterbore or relief 39 is provided around the inside edge of the tube end 29. The extended portion 37 of the ring 22 is made so as to have substantially the same volume of metal as was removed in the relief 39.

With the parts in the position shown in Fig. 3, an internal swage or punch 38 having an outside diameter slightly larger than the internal diameter of the tube 21 is pressed into the tube, as shown in Fig. 4. This operation serves to swage the extended portion 37 into the relief 39, against the inside surface of the tube 21.

Thus as shown in Fig. 4, the extended portion 37, when swaged into and against the tube 21, completely fills the relief 39 and leaves a smooth inside surface, while at the same time providing an inside locking joint 41 which prevents the end of the tube 21 from being pressed inwardly so as to loosen the engagement between the ridge and groove described hereinbefore.

Referring particularly to the enlarged fragmentary section, Fig. 5, the ridge 33 on the inner surface of the ring 22 is formed by relieving a portion of the inner surface of the ring 22 between the ridge 33 and the overlying end flange 36. This relief 42 may be made of somewhat larger diameter than the corresponding outer face 43 of the end of the tube 21. This permits of a rather wide latitude of machine tolerance, and renders the operation more economical, since it is rather costly to hold the diameter of the portion 42 to a narrow tolerance. The other portions of the ring, such as the inside surface 26 and the inside surface 44, may be held to closer tolerances, and are therefore shown in Fig. 5 as substantially contiguous with the corresponding portions of the other parts of the assembly.

The space 46 left between the surfaces 42 and 43 provides a region which readily accepts any expansion of the end of the tube 21 in case the swaged material in the extended portion 37 should exceed in volume the relief 39 in the tube 21. Thus a further latitude of fabrication tolerance is provided, in which the relief 39 need not match exactly the volume of the portion 37, but instead may be appreciably under the volume of the swaged-over portion. In such case the excess volume simply serves to expand the entire outer edge of the ring 21 into a portion of the unoccupied region 46, substantially as shown in Fig. 6. Here again a wider tolerance latitude lends itself to more economical machining operations.

In this swaging operation, wherein the portion 37 is swaged over into the relief 39, it has been found in practice that a force up to 20 tons on the punch or swage 38 is required for the particular ring and tube described specifically hereinbefore.

A product as described hereinbefore has been fabricated in accordance with the method described above, having the following dimensional parameters:

Inside diameter 23 of the tube 21—2.818 inches. Thickness of tube 21 between surfaces or sides 23 and 24—.172 inch. Depth of face 31 of groove 28—.030 inch. Obliquity of face 32 of groove 28 with respect to outer tube face 24—13°. Distance between face 31 and end edge 29—.120 inch. Diameter of counterbore or relief 39—2.863 inches. Depth of counterbore or relief 39 parallel to the tube axis—.045 inch. Inside diameter 26 of ring 22—2.991 inches. Diameter of surface 43 of tube 21—2.990 inches. Inside diameter of surface 42 on ring 22—3.00 inches. Inside diameter 47 of extended flange portion 37—2.758 inches. Inside diameter 48 of normal flange portion 36—2.818 inches. Outside diameter of punch 38—2.828. Material of tube and ring 4130 heat-treated chrome nickel steel of 38–42 Rockwell C hardness.

The parameters and dimensions given above are merely illustrative of one particular form of article of the many which have actually been fabricated. It will be understood that each of the dimensions has a range of tolerance well understood in the machining art, and that when the hardness of the material is changed, the tolerances must also be changed. It will be noted in the above example that the punch diameter is given as .010 inch larger than the inside diameter of the tube. Thus, in the example given, the punch actually expands the tube slightly during the swaging operation. This is advisable in order to assure that the swaged portion which forms the locking joint 41 will be stressed slightly beyond its final form, so that upon removal of the punch the joint 41 will still be in tight engagement with the tube. At the same time the tube itself is not stressed beyond its elastic limit, but returns to its original diameter. The enlarged diameter of the punch also takes care of the fact that in most cases the punch itself actually ensmalls slightly, but within its elastic limit, during the swaging operation.

In practice it has been found that the diameter of the punch 38 may range from .002 to .015 inch larger than the inside diameter of the tube 21, depending on the mass and hardness of the components which are to be moved by the punch.

An article constructed as described hereinbefore withstood a separation force of 20 tons before the ring 22 broke away from the tube 21. Before this destruction test the joint between the tube and ring was subjected to a hydrostatic pressure of 8000 pounds per square inch, without passage of any water.

The method and resulting article of the present invention are also applicable to other forms or embodiments, which are illustrated by way of example in the remaining figures of the drawing.

Figs. 7, 8, and 9 illustrate that the ridge and groove connection between the ring and tube may be reversed. That is to say, the ridge 33a may be formed on the outside of the tube 21a, while the groove 28a may be formed on the inside of the ring 22a. The method of securement and attachment is substantially the same. As the ring 22a is pressed over the end of the tube 21a, the wedge face 34a of the ridge 33a rides inside the inner edge of the ring 22a, compressing the tube slightly and expanding the ring slightly. When the ring has been pressed far enough onto the tube, the groove 33a snaps abruptly into the groove 28a. After the ridge and groove have snapped together, the extended flange portion 38a is swaged over and down into the tube relief or counterbore 39a to provide the inner securing lock 41a, as in the embodiment first described.

The instant invention is also applicable to the situation where it is desired to secure an end piece or ring to the inside surface instead of the outside surface of a tube. As shown in Figs. 10, 11 and 12, the tube 21b is provided on its inside or inner diameter 23b, with a triangular groove 28b. The outer face 27b of the ring 22b is provided with a ridge 33b adapted to mate within the groove 28b. In this case the relief on the end of the tube is formed on the outside of the tube as shown at 39b in Fig. 10. After the ring 22b has been pressed into the tube 23b as shown in Fig. 11, an annular or ring-like swage 38b is forced around the outside of the tube to swage the outwardly extended portion 37b of the ring 22b over and around the outside of the tube into the relief 39b, as shown in Fig. 12.

As in the first two embodiments, the embodiment shown in Figs. 10, 11, and 12, may also be practiced in a form in which the ridge and groove are reversed. This is illustrated in Figs. 13, 14, and 15 wherein the ridge 33c is formed on the inside surface of the tube 21b whereas the corresponding groove 28b is provided around the outer surface of the ring 22c.

It will be noted in any case that the oblique face 34 of the ridge and groove are so placed as to provide for the appropriate wedging action as the ring is pressed onto or into the tube, as the case may be.

While the embodiments described thus far have employed an annular, open centered ring as the end piece which is secured to the end of the tube 21, the instant invention is also applicable to the situation where the end piece does not have an inner diameter corresponding to that of the tube, or even where the end piece has no opening whatever in the center, as in the case of a cap. Such an embodiment is shown in Fig. 16, wherein the cap 22d has a flange portion 51 which is forced over the outer surface of the end of the tube 21d. Within the portion 51 is provided a ridge 33d which mates in a groove 28d formed peripherally around the outer surface of the tube 21d. In this case it is not necessary to provide any relief on the inside edge of the tube 21d, since there is no requirement that the finished inside diameter of the product be the same as that of the tube. In this case the cap 22d is provided with an annular, inwardly extending portion 37d which extends just inside the mouth of the tube 21d.

After the cap 22d is snapped over the end of the tube 21d, the portion 37d is swaged firmly against the inner surface of the tube 21d, as shown in Fig. 17, by means of a suitably shaped internal punch or swage 38d which is applied to the article from the other end of the tube. In this embodiment it is advisable to form the inwardly extending portion 37d with a measurable space 52 between it and the inside of the tube 21d. This allows for the momentary inward contraction of the end of the tube 21d and momentary outward expansion of the cap 22d, as the cap is pressed over the tube and the wedge surface on the ridge 33d is brought into play prior to the snapping of the ridge into the groove.

While the principles of the instant invention are applicable to any securement of a metal end piece over the end of a metal tube, they are particularly applicable to tempered or hardened metals which would lose their hardness through thermal weldment, such materials being exemplified by those steels having a hardness of from 25 to 45 on the Rockwell C scale.

While the instant invention has been shown and described herein in what is conceived to be the most practical and preferred embodiments, it is recognized that departures may be made therefrom within the scope of the invention, which is therefore not to be limited to the details disclosed herein but is to be accorded the full scope of the claims.

I claim:

1. The method of securing an end of a hollow cylindrical tubular member in telescoping relation to a hollow cylindrical portion of a separate member, comprising the steps of; forming a shallow circumferential groove in a cylindrical surface of one of said members, forming a circumferential rib on the mating cylindrical surface of the other member complementary in size and shape to said groove and having abutting surfaces substantially perpendicular to the axes of said members and oblique camming surfaces, forcing said members axially to cam said rib over said one member into telescoping relation thereto to snap said rib into said groove, and swaging a portion of said separate member into firm engagement with the cylindrical surface of said tubular member opposite said mating groove and rib.

2. The method set forth in claim 1 including the step of forming said separate member with a portion to extend across the end of said tubular member, said swaging step being performed on said last-named portion.

3. The method set forth in claim 2 including the step of forming an end rabbet in the cylindrical surface of said tubular member opposite said mating groove and rib, said swaging step being performed to swage said last-named portion into said rabbet and into flush relation to the adjacent cylindrical surface.

References Cited in the file of this patent

UNITED STATES PATENTS

| | | |
|---|---|---|
| 167,339 | Jerrold | Aug. 31, 1875 |
| 1,098,974 | Reilly | June 2, 1914 |
| 1,794,849 | Hagstedt | Mar. 3, 1931 |
| 1,884,155 | Oestnaes | Oct. 25, 1932 |
| 1,928,836 | Loughead | Oct. 3, 1933 |
| 1,975,885 | Wellman | Oct. 9, 1934 |
| 2,268,787 | Wales | Jan. 6, 1942 |
| 2,417,350 | Conroy | Mar. 11, 1947 |